(12) United States Patent
Hviid et al.

(10) Patent No.: US 12,369,059 B2
(45) Date of Patent: Jul. 22, 2025

(54) TERMINAL UPLINK PARAMETER BASED MEASUREMENT RELAXATION CHANGE

(71) Applicant: Nokia Technologies Oy, Espoo (FI)

(72) Inventors: Jan Torst Hviid, Klarup (DK); Thomas Bai Brondum, Aalborg (DK); Daniela Laselva, Klarup (DK); Faranaz Sabouri-Sichani, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 469 days.

(21) Appl. No.: 17/764,682

(22) PCT Filed: Sep. 16, 2020

(86) PCT No.: PCT/FI2020/050591
§ 371 (c)(1),
(2) Date: Mar. 29, 2022

(87) PCT Pub. No.: WO2021/064283
PCT Pub. Date: Apr. 8, 2021

(65) Prior Publication Data
US 2022/0361030 A1 Nov. 10, 2022

(30) Foreign Application Priority Data
Sep. 30, 2019 (FI) .................................. 20195832

(51) Int. Cl.
*H04W 24/10* (2009.01)
*H04B 17/318* (2015.01)
(Continued)

(52) U.S. Cl.
CPC .......... *H04W 24/10* (2013.01); *H04B 17/318* (2015.01); *H04W 52/0232* (2013.01); *H04W 76/28* (2018.02); *H04W 52/146* (2013.01)

(58) Field of Classification Search
CPC ................ H04B 17/318; H04W 24/10; H04W 36/0085; H04W 52/0232; H04W 52/146; H04W 76/28; Y02D 30/70
See application file for complete search history.

(56) References Cited

U.S. PATENT DOCUMENTS 12,089,162 B2 * 9/2024 Kaikkonen ........... H04W 76/28
2017/0150384 A1 5/2017 Rune et al.
(Continued)

FOREIGN PATENT DOCUMENTS

WO WO 2013/176481 A1 11/2013

OTHER PUBLICATIONS

"Consideration on Measurement Relaxation", Apple, 3GPP TSG-RAN WG2 Meeting #107, R2-1909869, Aug. 2019, 2 pages.
(Continued)

*Primary Examiner* — Liton Miah
(74) *Attorney, Agent, or Firm* — McCarter & English LLP

(57) ABSTRACT

There are provided measures for terminal uplink parameter based measurement relaxation change. Such measures exemplarily include, at a terminal in a radio resource management measurements relaxation mode having a reduced intensity of radio resource management measurements, receiving a first uplink control command indicative of a first uplink control parameter related to a radio connection of said terminal, and deciding on exiting said radio resource management measurements relaxation mode based on said first uplink control parameter.

17 Claims, 14 Drawing Sheets

(51) Int. Cl.
*H04W 52/02* (2009.01)
*H04W 76/28* (2018.01)
*H04W 52/14* (2009.01)

(56) References Cited

U.S. PATENT DOCUMENTS

| | | | |
|---|---|---|---|
| 2019/0037425 A1 | 1/2019 | Hong et al. | |
| 2020/0029256 A1* | 1/2020 | Rico Alvarino | H04W 72/0453 |
| 2020/0146095 A1* | 5/2020 | Hsieh | H04W 52/52 |
| 2022/0131596 A1* | 4/2022 | Sharma | H04W 36/0085 |
| 2022/0330339 A1* | 10/2022 | Siomina | H04W 74/0816 |

OTHER PUBLICATIONS

"RRM measurement relaxation in time domain", vivo, 3GPP TSG-RAN WG2 Meeting #107, R21909534, Aug. 2019, 4 pages.
"Power Saving for RRM Measurement in NR", Media Tek Inc., 3GPP TSG-RAN WG2 Meeting #105bis, R2-1903245, Apr. 2019, 7 pages.
3GPP TSG-RAN WG2 Meeting #107, Prague, Czech Republic, Aug. 26-30, 2019, R2-1908951, "Power Saving for RRM Measurements in NR", MediaTek Inc., 7 pgs.
3GPP TSG RAN Meeting #84, Newport Beach, USA, Jun. 3-6, 2019, RP-191607, "New WID: UE Power Saving in NR", CATT, CAICT, 5 pgs.
3GPP TR 38.840, V16.0.0 (Jun. 2019), "3rd Generation Partnership Project; Technical Specification Group Radio Access Network; NR; Study on User Equipment (UE) power saving in NR (Release 16)", 74 pgs.

* cited by examiner

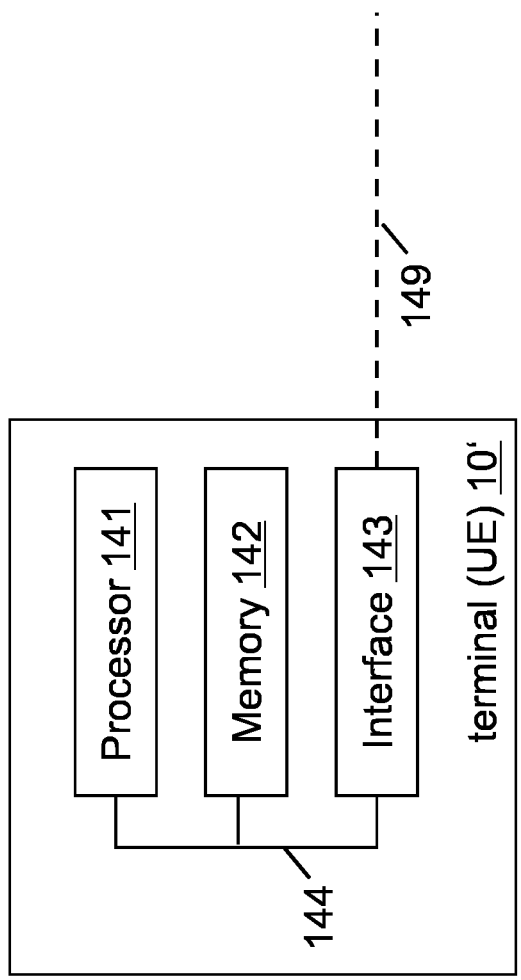

TERMINAL UPLINK PARAMETER BASED MEASUREMENT RELAXATION CHANGE

CROSS REFERENCE TO RELATED APPLICATION

This patent application is a U.S. National Stage application of International Patent Application Number PCT/FI2020/050591 filed Sep. 16, 2020, which is hereby incorporated by reference in its entirety, and claims priority to FI 20195832 filed Sep. 30, 2019.

FIELD

Example embodiments relate to terminal uplink parameter based measurement relaxation change. More specifically, example embodiments exemplarily relates to measures (including methods, apparatuses and computer program products) for realizing terminal uplink parameter based measurement relaxation change.

BACKGROUND

The present specification generally relates to power saving mechanisms for mobile terminals. Such mobile terminals may for example be user equipments (UE) in mobile networks such as 3$^{rd}$ Generation Partnership Project (3GPP) 5G communication systems.

It is assumed that such UE can utilize different power saving schemes as indicated in 3GPP TR 38.840 and according to the Work Item RP-191607. In particular, power consumption reduction applying relaxation in RRM measurements is considered, where if certain conditions—e.g. UE in stationary or low mobility condition and/or favorable reference signal received power (RSRP) conditions, indicating a UE is not at cell edge, and/or a limited change of the RSRP within a time period—are fulfilled, the radio resource management (RRM) measurements can be adopted to follow more relaxed requirements.

Hereinafter, the term "Power Saving mode" (or "PS-mode" in the rest of the document) is used when referring to "enabled" relaxation of RRM measurements as well as any other measurements.

The measurement activities are divided in measurements on reference signal(s), filtering in two levels at physical layer (L1 filtering) and then radio resource control (RRC) level (L3 filtering), and finally measurement reporting for UEs in RRC connected state. The measurements are applied directly at the UE e.g. for cell selection/reselection purposes for UEs in RRC idle/inactive state.

Each measurement, corresponding processing, and reporting consumes significant UE power which can be unnecessary when the UE is in good radio conditions. Especially, adapting measurements for lower power consumption with negligible impact in performance can be achieved for UEs in low traffic areas (thus with low/no interference), in low/semi static (low mobility) condition, where low time and frequency channel variations can be expected.

The relaxation of RRM measurements can have several levels, such as, e.g., relaxing the inter-frequency and/or inter-RAT measurements only (RAT: radio access technology), relaxing inter- as well as intra-frequency neighbor cell measurements, and complete relaxation (including serving cell).

The above-mentioned 3GPP TR 38.840 and Work Item RP-191607 suggest considering one or more of the below relaxation schemes for all of the levels mentioned above (incl. intra-frequency and/or inter frequency measurements) for UEs whose serving cell is in good radio conditions:
  Increasing the measurement period
  Reducing the number of samples (e.g., orthogonal frequency division multiplex[ing] (OFDM) symbols/slots) within a measurement period (e.g., SMTC window (SMTC: SS/PBCH block measurement time configuration, SS/PBCH: synchronization signal/physical broadcast channel))
  Confining RRM measurements within a measurement window and increasing the periodicity of the measurement window for intra-frequency and/or inter-frequency measurement.

Furthermore, the following mechanisms can also be used to achieve UE power saving:
  Reducing the number of neighbor cells targeted for intra-frequency measurement and/or inter-frequency measurement and/or inter-RAT measurement:
    Assuming UE can limit the processing for measurement within a constrained time period and/or with reduced complexity
    Assuming number of neighboring cells to be measured is reduced
  Reducing the need in neighbor cell intra-frequency measurement.

FIG. 4 is a schematic diagram illustrating exemplary implementations of a discontinuous reception (DRX) cycle and in particular illustrates
  (a) a DRX cycle with "default" DRX cycles and RRM measurements, where the measurements are performed once for each DRX cycle,
  (b) relaxed RRM measurements by reducing the periodicity of the measurements, which are performed every three DRX cycles, and
  (c) relaxed RRM measurements by reducing the number of measurements.

In detail, FIG. 4 illustrates exemplary RRM measurement relaxations, where measurements are shown to be aligned with a DRX cycle.

While this alignment is not necessarily the case since it depends on the network defined measurement period configuration (e.g. SMTC cycle and offset) and the DRX configuration (DRX cycle and offset), in FIG. 4 it is assumed that the measurements are performed just before the DRX ON-duration.

As long as a network-defined measurement period is aligned with the DRX cycle, the major contributor to power saving is the increase of the measurement periodicity and the removal of neighbors from the neighbor cell measurements in scope, to reduce the UE activity for running the measurements.

However, as mentioned above, it is not always possible for the network to ensure the alignment of the measurement period with the DRX cycle, at least it may not be possible for all the UEs in the network, as is the case in FIG. 4.

Hence, in case the measurements are not aligned with the DRX cycle, it is beneficial that in a given DRX cycle any measurements—including the serving cell measurement—can be relaxed, since the UE power-up and power-down time outside the DRX ON-duration would add significantly to the total power consumption even when it is only one cell (the serving one) to be measured.

According to the UE power model defined in the above-mentioned 3GPP TR 38.840, a total transition time of 20 ms (or 6 ms) should be considered for UE's power-up plus power-down time from deep sleep (or light sleep), to the active state, in which measurements can be performed.

The ramping up/down time entails a ramping up/down power consumption, which is of 450 units (for deep sleep) and 100 units (for light sleep).

Considering that the measurement period lasts 3 or 5 ms at the most, this is significantly shorter than the ramping up/down.

This highlights the importance from UE power saving view to avoid measuring altogether, whenever possible.

FIG. 5 is a schematic diagram illustrating an implementation of a discontinuous reception cycle and in particular illustrates a DRX cycle, DRX ON-durations (in general the PDCCH monitoring period within the DRX cycle) and measurement windows.

In particular, FIG. 5 illustrates how a measurement which is not aligned with a DRX cycle will result in increase in UE's total active time and prevent it to go to deep sleep (or light sleep).

The RRM measurements (e.g. reference signal received power (RSRP)/reference signal received quality (RSRQ)) are used to constantly evaluate the quality of the UE connection towards its serving cell and its (intra/inter-frequency/inter-RAT) neighbor cells.

When in RRC Connected mode, the UE reports correspondingly the results to the network (NW) when specific change(s) in the signal condition is(are) observed, according to configured measurements events such as e.g. measurement reporting event A3 (3GPP TS 38.331).

The NW ensures that a UE in RRC connected state is connected to the best NB measured by signal level and quality by evaluating the measurement reports and requesting a hand-over to a new target cell if the measurements show better coverage from the target cell.

Based on estimating good signal condition and low mobility (e.g. RSRP serving cell being above a threshold defined by the network), the UE can relax the RRM measurements as described above.

However, if the applied relaxation includes also the serving cell measurements, when the NW condition changes—for instance due to the UE's (sudden) increased mobility—the UE may also fail to detect the fast change due to missing RSRP/RSRQ measurements of the serving cell, and this may eventually also end up in radio link failure (RLF).

This is because, the relaxed RRM measurements can result in the UE missing a HO to a stronger intra-frequency neighbor, which will cause strong interference for the UE, which may lead to operation in degraded performance and may, in the worst case, cause RLF.

There are presently no means known for a UE to relax the serving cell measurements without increasing the possibility of RLF.

Hence, the problem arises that the UE's ability to track the change in radio link condition of its serving cell as well as of its neighbor cells is reduced when it is in power saving mode (utilizing relaxed RRM measurement schemes).

Thus, there is a benefit to use indirect information about the radio relevance of cells and the change in radio relevance in the absence of direct measurements (i.e. without intra-frequency, inter-frequency, and/or inter-RAT measurements during measurement relaxation) e.g. based on a terminal uplink parameter. The radio relevance can be defined for instance as a relative measure, by ranking the cells from the strongest cell (i.e. the cell with the highest relevance) to the weakest cell (lowest relevance). Also, it could be defined as an absolute measure, where the relevant cells are the ones whose radio level/quality is good enough, e.g. above an absolute threshold. Thus, an indirect information about any changes in radio relevance of neighbor cells in comparison to the serving cell and/or about changes in time in radio condition of the serving cell could be used to adjust the relaxation mode. We remark that although the primary cause of changes in radio relevance may be UE mobility, in general changes in the radio environment may be caused by other factors as well, such as the mobility of other UEs and/or other objects present in the environment.

SUMMARY

Various example embodiments aim at addressing at least part of the above issues and/or problems and drawbacks.

Various aspects of example embodiments are set out in the appended claims.

According some aspects, there is provided the subject matter of the independent claims. Some further aspects are defined in the dependent claims.

The embodiments that do not fall under the scope of the claims are to be interpreted as examples useful for understanding the disclosure.

According to an exemplary aspect, there is provided a method of a terminal in a radio resource management measurements relaxation mode having a reduced intensity of radio resource management measurements, the method comprising receiving a first uplink control command indicative of a first uplink control parameter related to a radio connection of said terminal, and deciding on exiting said radio resource management measurements relaxation mode based on said first uplink control parameter.

According to an exemplary aspect, there is provided an apparatus of a terminal in a radio resource management measurements relaxation mode having a reduced intensity of radio resource management measurements, the apparatus comprising receiving circuitry configured to receive a first uplink control command indicative of a first uplink control parameter related to a radio connection of said terminal, and deciding circuitry configured to decide on exiting said radio resource management measurements relaxation mode based on said first uplink control parameter.

According to an exemplary aspect, there is provided an apparatus of a terminal in a radio resource management measurements relaxation mode having a reduced intensity of radio resource management measurements, the apparatus comprising at least one processor, at least one memory including computer program code, and at least one interface configured for communication with at least another apparatus, the at least one processor, with the at least one memory and the computer program code, being configured to cause the apparatus to perform receiving a first uplink control command indicative of a first uplink control parameter related to a radio connection of said terminal, and deciding on exiting said radio resource management measurements relaxation mode based on said first uplink control parameter.

According to an exemplary aspect, there is provided a computer program product comprising computer-executable computer program code which, when the program is run on a computer (e.g. a computer of an apparatus according to any one of the aforementioned apparatus-related exemplary aspects), is configured to cause the computer to carry out the method according to any one of the aforementioned method-related exemplary aspects.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient estimation or prediction of a change of mobility and radio conditions even in relaxed measurement mode to thereby solve at least part of the problems and drawbacks identified in relation to the prior art.

By way of example embodiments, there is provided terminal uplink parameter based measurement relaxation change. More specifically, by way of example embodiments, there are provided measures and mechanisms for realizing terminal uplink parameter based measurement relaxation change.

Thus, improvement is achieved by methods, apparatuses and computer program products enabling/realizing terminal uplink parameter based measurement relaxation change.

BRIEF DESCRIPTION OF THE DRAWINGS

In the following, example embodiments will be described in greater detail by way of non-limiting examples with reference to the accompanying drawings, in which FIG. 14 is a block diagram alternatively illustrating an apparatus according to example embodiments.

DETAILED DESCRIPTION OF DRAWINGS AND EMBODIMENTS

Figure 1:
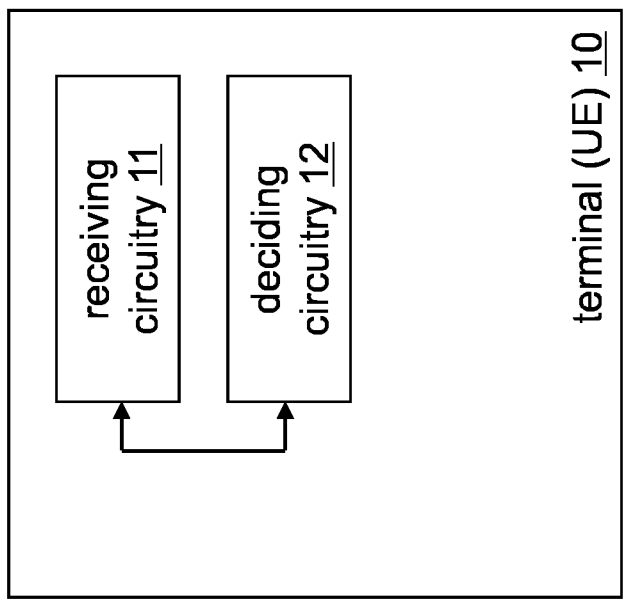
FIG. 1 is a block diagram illustrating an apparatus according to example embodiments.

Example embodiments are described herein with reference to particular non-limiting examples and to what are presently considered to be conceivable embodiments. A person skilled in the art will appreciate that example embodiments are by no means limited to these examples, and may be more broadly applied.

It is to be noted that the following description of example embodiments mainly refers to specifications being used as non-limiting examples for certain exemplary network configurations and deployments. Namely, example embodiments are mainly described in relation to 3GPP specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit example embodiments in any way.

Rather, any other communication or communication related system deployment, etc. may also be utilized as long as compliant with the features described herein.

Hereinafter, various embodiments and implementations and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to example embodiments, in general terms, there are provided measures and mechanisms for (enabling/realizing) terminal uplink parameter based measurement relaxation change.

The following can be generally assumed on RRM measurement relaxation, and is considered for example embodiments:

1. RRM measurement relaxation can be applicable in RRC_CONNECTED, RRC_INACTIVE and RRC_IDLE.
2. Relaxed monitoring criteria under which the UE may relax RRM measurements can consider both low mobility and UE location in the cell (e.g. whether the UE is in cell-edge) and may include the following aspects, but are not limited to:
   a. UE mobility status (e.g. serving cell variation, speed, movement, direction, cell (re-selection, UE type, etc.),
   b. Link quality (e.g. serving cell threshold/quality, position in cell, etc.),
   c. Serving cell beam status (e.g. beam change, direction, beam specific link condition, etc.).
3. The UE may activate relaxed measurement criteria if at least any of the following conditions are met:
   a. Serving Cell measurement does not change more than a relative threshold during a time period;
   b. UE is not a cell edge, meaning that serving cell/beam RSRP/RSRQ/SINR is above a threshold.
4. Serving cell measurements can be included in the evaluation of relaxed RRM measurements as well.

In general, in order to address the above-identified problem that the UE's ability to track the change in radio link condition of its serving cell as well as of its (intra-frequency) neighbor cells is reduced when it is in power saving mode (utilizing relaxed RRM measurement schemes), in particular the problem of detecting radio changes in the UE, when the RRM measurements (e.g. RSRP/RSRQ) of the neighbor cells and the serving cell are relaxed, thus RSRP/RSRQ are not available, according to the concept of example embodiments, alternative indicators are utilized to detect potential quality degradation when missing RSRP/RSRQ measurements.

Contrary thereto, currently known mobility measures rely on serving cell RRM measurements (RSRP/RSRQ) even when they are relaxed. This is mainly assuming that the RSRP of the serving cell will determine whether to relax the measurements of the neighbor cells. In order to evaluate a UE's mobility state and/or change in radio relevance it was further suggested to use external/non-3GPP information as e.g. from GPS.

The concept of example embodiments is applicable for a UE in RRC_CONNECTED state where the channels like PDCCH, PDSCH, PUCCH, and PUSCH are used to carry control and data packets on DL and UL, respectively.

According to example embodiments, the UE uses alternative measures (other than RSRP/RSRQ), computed during normal UE data exchange operations, which indicate indirectly a change in the distance between the transmitter and receiver.

Based on these alternative measures, the UE determines when to exit the relaxed measurement state.

The alternative measures according to example embodiments relate to uplink control parameters of the UE, namely, the uplink transmit power and the uplink transmission timing.

These two measures are continuously controlled by gNB and informed to UE using transmit power and timing control commands, TPC and TA. The receiving UE monitors and calculates the absolute transmit power level and timing based on these commands and utilizes them as indicators to decide if/when there are changes in the UE's radio channel condition.

In 3GPP systems including 5G NR, the UE determines the uplink transmit power, e.g. of the Physical Uplink Shared Channel (PUSCH), according to the uplink power control scheme in an open loop fashion based on network-configured parameters (e.g. alpha, PO).

In addition, the gNB can dynamically control the uplink transmit power level in a closed loop form by sending transmit power control (TPC) commands via medium access control (MAC) control element (CE) or TPC field in downlink control information format 0 (DCI 0), as described in TS 38.213.

Figure 6:
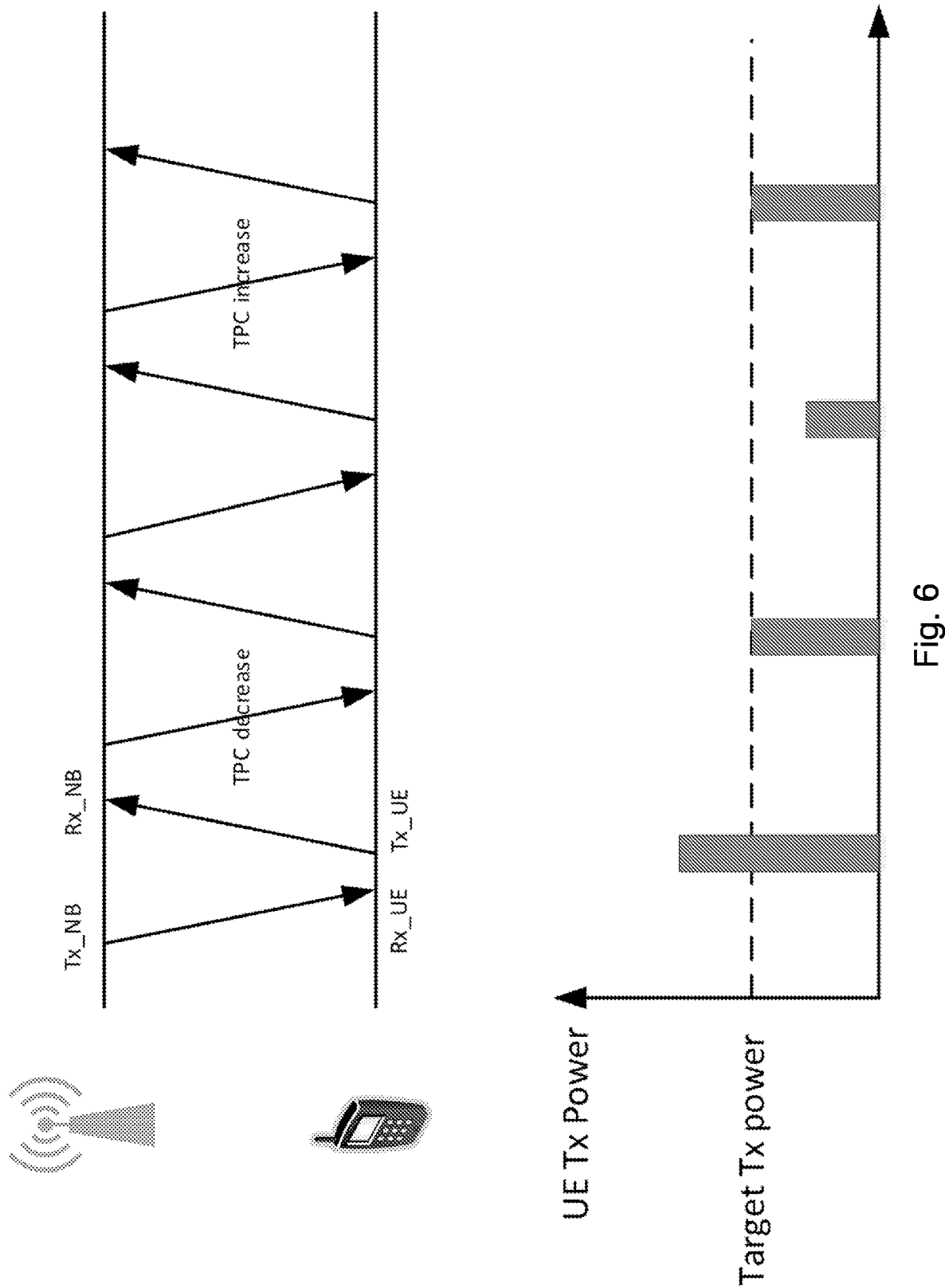
FIG. 6 is a schematic diagram illustrating signaling of an uplink power control.

FIG. 6 is a schematic diagram illustrating signaling of an uplink power control and in particular illustrates basics of an uplink power control.

As is derivable from FIG. 6, a TPC command can instruct the UE to e.g. increase or decrease the power with the purpose to refine/tune the uplink power and mitigate changes in the environment like propagation path loss, interference, fading etc.

The following table illustrates in which way the UE uplink power is adjusted by a respective TPC command (TPC command field).

| TPC command field | Accumulated $\delta_{PUSCH, c}$ [dB] | Absolute $\delta_{PUSCH, c}$ [dB] |
|---|---|---|
| 0 | −1 | −4 |
| 1 | 0 | −1 |
| 2 | 1 | 1 |
| 3 | 3 | 4 |

In particular, this table illustrates the mapping of a TPC Command Field in DCI format 0_0, DCI format 0_1, or DCI format 2_2, or DCI format 2_3 having CRC parity bits scrambled by TPC-PUSCH-RNTI or TPC-SRS-RNTI, to absolute and accumulated PUSCH values (3GPP TS 38.231).

Further, in 3GPP systems including 5G NR, the uplink transmission timing for a UE is controlled from the gNB using timing advance (TA) commands for instructing the UE to adjust its uplink timing.

The timing advance procedure is described in 3GPP TS 38.213 and 38.133.

The purpose of the uplink timing control is to compensate for the UE uplink transmission time error $t_{Rx\_error}$. The timing error is due to the radio waves propagation time between the UE's transmitter and gNB's receiver.

Figure 7:
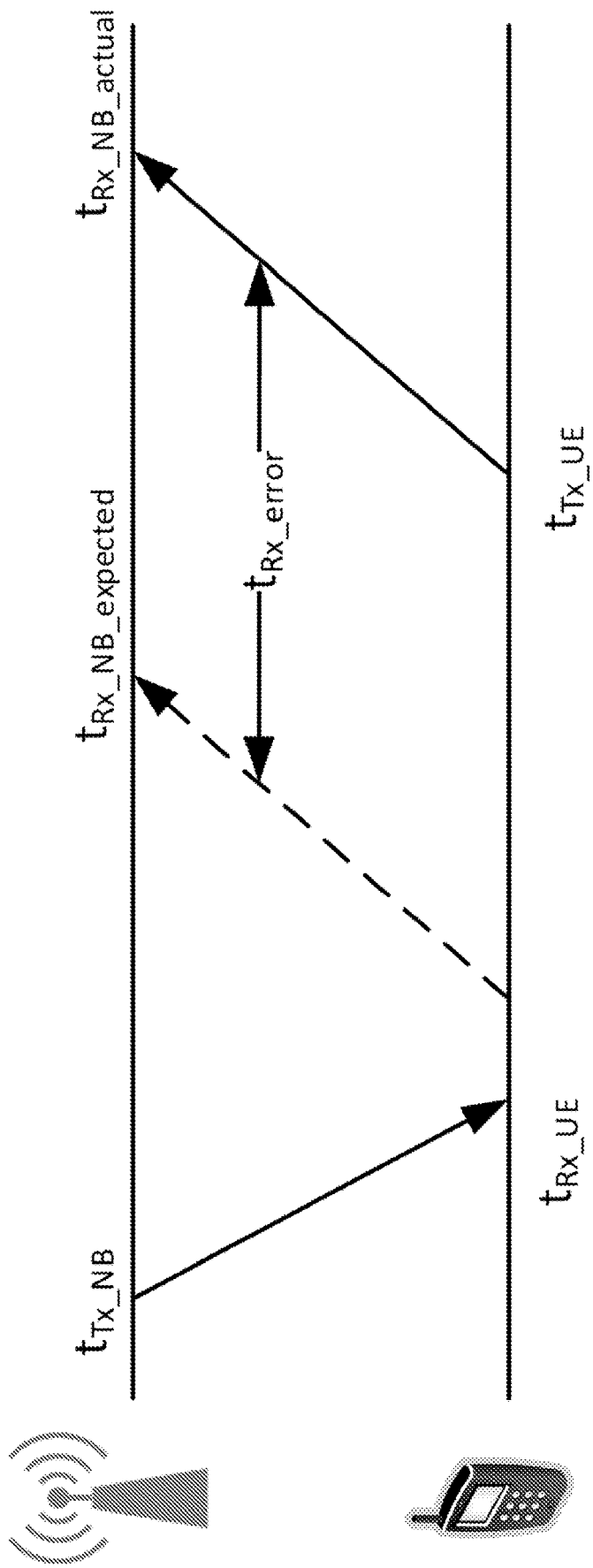
FIG. 7 is a schematic diagram illustrating signaling of an uplink transmission timing control.

FIG. 7 is a schematic diagram illustrating signaling of an uplink transmission timing control, and in particular illustrates a UE uplink transmission time error.

Here, the signal path length/distance between UE and gNB can be estimated, at UE side, using the timing advance. The accuracy of the estimate depends on the sub-carrier spacing and the 3GPP defined maximum allowed timing error.

The distance between the UE (terminal) and the NodeB (NB) of the cell can be calculated in the UE as:

$$d_{UE-NB} = \frac{c \cdot N_{TA}}{2},$$

where $c$ is the speed of light and $N_{TA}$ is the timing advance

The table below illustrates the accuracy of the TA steps for each Sub-Carrier Spacing (SCS) index.

| SCS index | SCS [kHz] | Step size [ns] | Distance [m] |
|---|---|---|---|
| 0 | 15 | 520.8 | 78.07 |
| 1 | 30 | 260.4 | 39.04 |
| 2 | 60 | 130.2 | 19.52 |
| 3 | 120 | 65.1 | 9.76 |
| 4 | 240 | 32.6 | 4.88 |
| 5 | 480 | 16.3 | 2.44 |

It is noted that this continuous monitoring occurs whenever there is traffic on the control and/or data channel, i.e. outside of a normal RRM measurement window when the UE is anyway not in sleep.

According to example embodiments, RRM measurements are adapted based on the measure "uplink transmit power", based on the measure "uplink transmission timing", or based on a combination of the two measures.

In particular, as the first alternative, the UE exits the relaxed measurement state as function of the uplink transmit power:

Option 1: exit when the absolute level of the UE uplink transmit power is above a threshold T1, Option 2: exit when the relative variation of the uplink transmit power in time is above a certain threshold, Option 2.a: exit when N1 (count) subsequent TPC commands indicating to increase the transmit power have been received, Option 2.b: exit when at least N2 (count) TPC commands indicating to increase the transmit power have been received within a time window w, Option 2.c: exit when one or more TPC commands indicating to increase the transmit power have been received, where the total power increase in dB is above a threshold T2, or Option 2.d: any combination of the above.

Further, as the second alternative, the UE exits the relaxed measurement state as function of the uplink transmission timing:

Option 1: exit when the uplink timing adjustment decreases by a certain threshold T11, or Option 2: exit when M (count) subsequent uplink timing adjustments indicate decrease of the timing or the total decreases is above a certain threshold T12.

Furthermore, as the third alternative, the UE exits the relaxed measurement state as a combination of the first alternative and the second alternative taking signal path distance into account.

Basis for the concept of example embodiments as outlined above is that for a stationary UE in a static environment, it is not expected that the two alternative measures (uplink transmit power, uplink transmission timing) will change much. In this case, the UE can safely remain in the relaxed measurement state. Instead, when/if the UE starts moving, both measures will likely change, and according to example embodiments, such change will be used as an indication to resume the normal measurement procedures.

Figure 3:
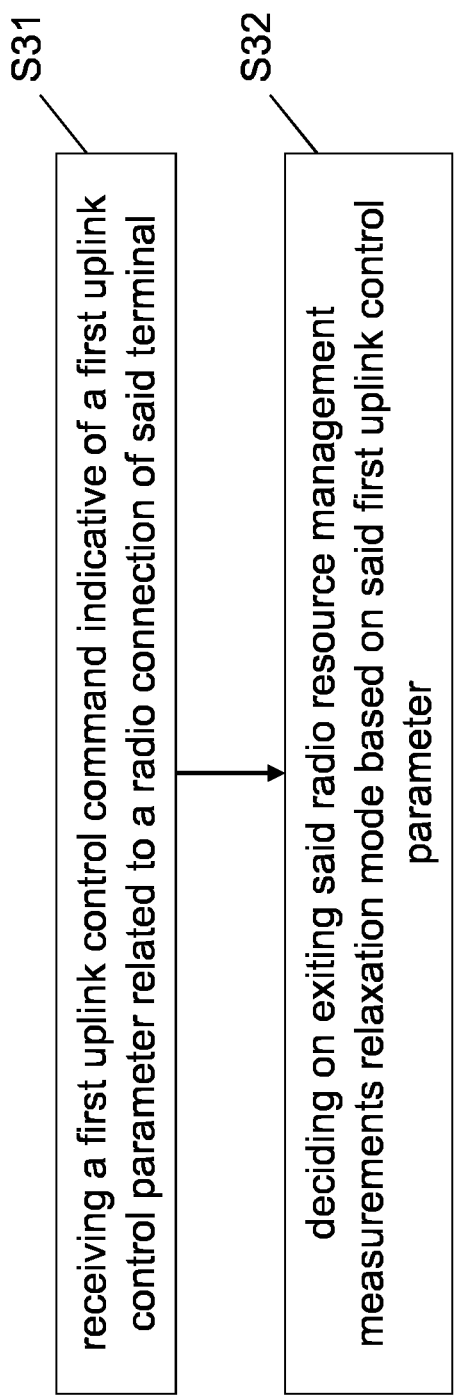
FIG. 3 is a schematic diagram of a procedure according to example embodiments.
Figure 4:
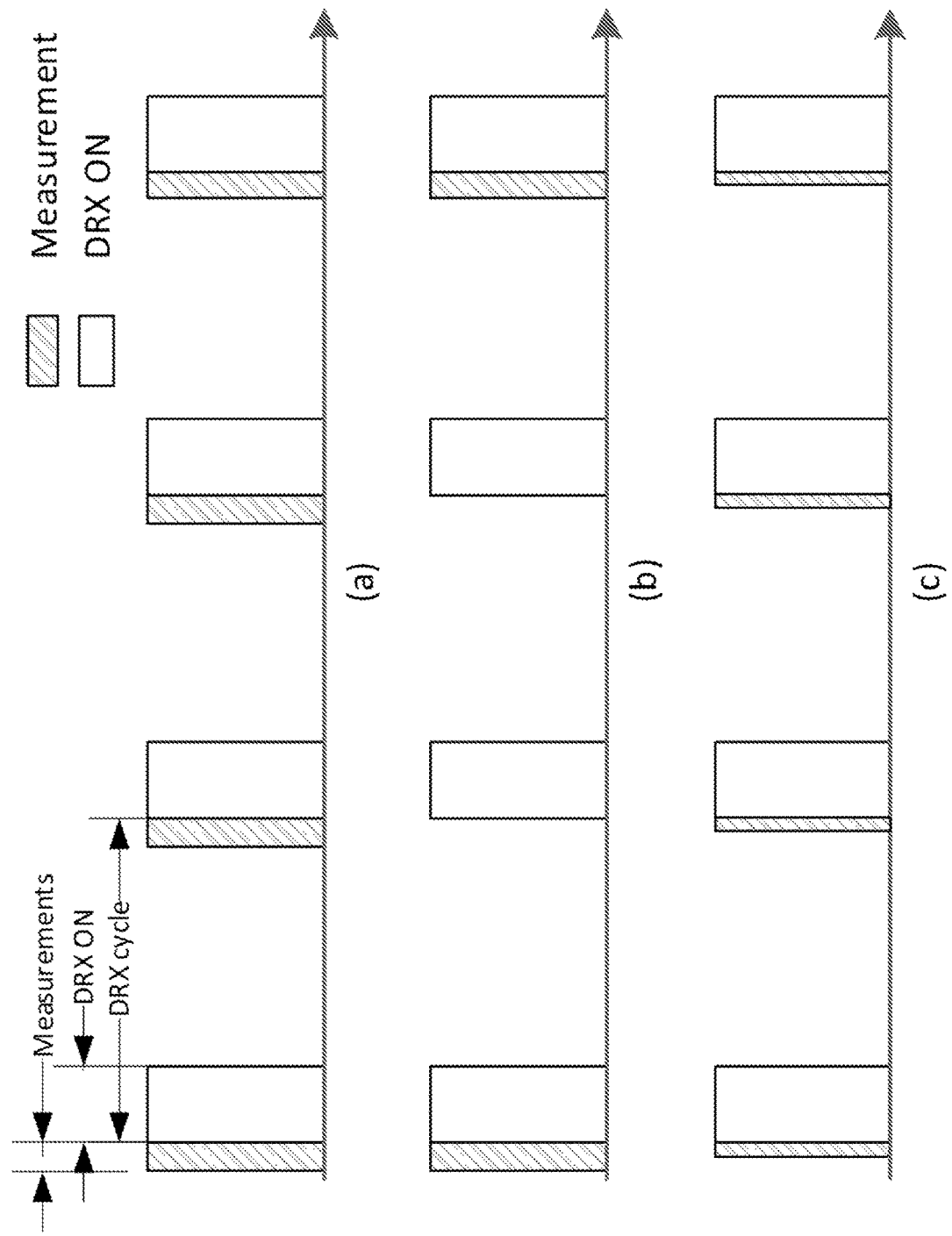
FIG. 4 is a schematic diagram illustrating implementations of a discontinuous reception cycle, and default RRM measurements (a) together with two possible measurement relaxation schemes (b and c)
Figure 5:
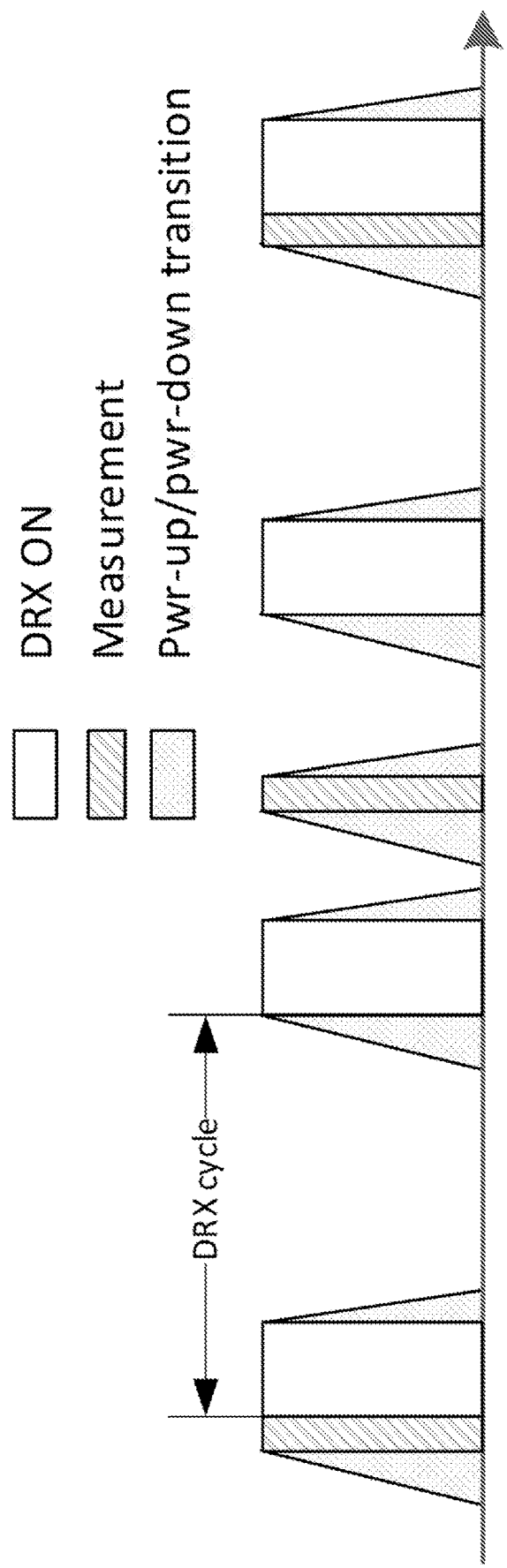
FIG. 5 is a schematic diagram illustrating an implementation of a discontinuous reception cycle, and RRM measurements together with UE's power-up and power-down.

In more specific terms, FIG. 1 is a block diagram illustrating an apparatus according to example embodiments. The apparatus may be a terminal 10 such as a user equipment in a radio resource management measurements relaxation mode having a reduced intensity of radio resource management measurements, the apparatus comprising a receiving circuitry 11 and a deciding circuitry 12. The receiving circuitry 11 receives a first uplink control command indicative of a first uplink control parameter related to a radio connection of said terminal. The deciding circuitry 12 decides on exiting said radio resource management measurements relaxation mode based on said first uplink control parameter. FIG. 3 is a schematic diagram of a procedure according to example embodiments. The apparatus according to FIG. 1 may perform the method of FIG. 3 but is not limited to this method. The method of FIG. 3 may be performed by the apparatus of FIG. 1 but is not limited to being performed by this apparatus.

As shown in FIG. 3, a procedure according to example embodiments comprises an operation of receiving (S31) a first uplink control command indicative of a first uplink control parameter related to a radio connection of said terminal, and an operation of deciding (S32) on exiting said radio resource management measurements relaxation mode based on said first uplink control parameter.

Figure 2:
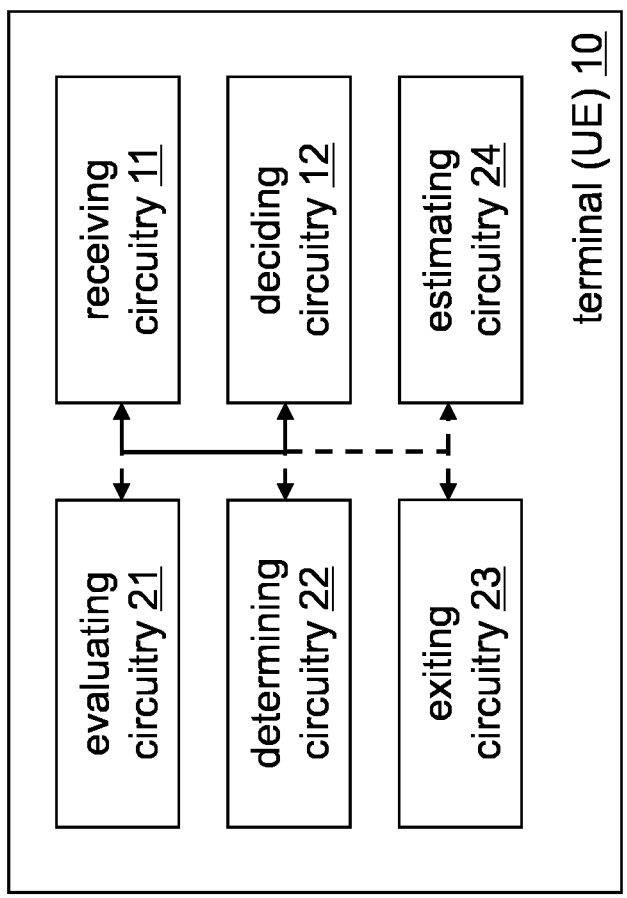
FIG. 2 is a block diagram illustrating an apparatus according to example embodiments.

FIG. 2 is a block diagram illustrating an apparatus according to example embodiments. In particular, FIG. 2 illustrates a variation of the apparatus shown in FIG. 1. The apparatus according to FIG. 2 may thus further comprise evaluating circuitry 21, determining circuitry 22, exiting circuitry 23, and/or estimating 24.

In an embodiment at least some of the functionalities of the apparatus shown in FIG. 1 (or 2) may be shared between two physically separate devices forming one operational entity. Therefore, the apparatus may be seen to depict the operational entity comprising one or more physically separate devices for executing at least some of the described processes.

According to a variation of the procedure shown in FIG. 3, exemplary details of the deciding operation (S32) are given, which are inherently independent from each other as such.

Such exemplary deciding operation (S32) according to example embodiments may comprise an operation of evaluating whether said first uplink control parameter is indicative of exceeding a predetermined radio condition deterioration, and an operation of determining, if said first uplink control parameter is indicative of exceeding said predetermined radio condition deterioration, to exit said radio resource management measurements relaxation mode.

Said predetermined radio condition deterioration may be pre-configured, may be derived e.g. by the terminal e.g. based on a history (e.g. history values), or may correspond to downloaded predetermined values (downloaded by e.g. the terminal vendor and/or chipset maker), where the downloaded predetermined values may be based on laboratory tests and/or simulations.

According to example embodiments, said terminal is in a radio resource control connected state.

According to further example embodiments, said first uplink control parameter is indicative of exceeding said predetermined radio condition deterioration related to a distance between said terminal and a counterpart of said radio connection.

According to a variation of the procedure shown in FIG. 3, exemplary details of the receiving operation (S31) are given, which are inherently independent from each other as such.

Such exemplary receiving operation (S31) according to example embodiments may comprise an operation of receiving a plurality of first uplink control commands including said first uplink control command and being indicative of said first uplink control parameter related to said radio connection of said terminal.

According to still further example embodiments, said first uplink control command is a transmission power command, and said first uplink control parameter is an uplink transmit power.

According to a variation of the procedure shown in FIG. 3, exemplary additional operations are given, which are inherently independent from each other as such. According to such variation, an exemplary method according to example embodiments may comprise an operation of exiting, if said first uplink control command is indicative of an increment of said uplink transmit power and an absolute value of said uplink transmit power ascertained based on said increment of said uplink transmit power is larger than an uplink transmit power threshold, said radio resource management measurements relaxation mode.

According to still further example embodiments, said radio resource management measurements relaxation mode is exited if said absolute value of said uplink transmit power is larger than said uplink transmit power threshold by at least a predetermined hysteresis.

Said predetermined hysteresis may be pre-configured, may be derived e.g. by the terminal e.g. based on a history (e.g. history values), or may correspond to downloaded predetermined values (downloaded by e.g. the terminal vendor and/or chipset maker), where the downloaded predetermined values may be based on laboratory tests and/or simulations.

According to a variation of the procedure shown in FIG. 3, exemplary additional operations are given, which are inherently independent from each other as such. According to such variation, an exemplary method according to example embodiments may comprise an operation of exiting, if said first uplink control command is indicative of an increment of said uplink transmit power and a change of said uplink transmit power in time ascertained based on said increment of said uplink transmit power is larger than an uplink transmit power change threshold, said radio resource management measurements relaxation mode.

According to still further example embodiments, said radio resource management measurements relaxation mode is exited, if a predetermined first number of subsequent first uplink control commands indicative of an increase of said uplink transmit power were received, and/or if a predetermined second number of first uplink control commands indicative of an increase of said uplink transmit power were received within a predetermined period of time, and/or if at least one first uplink control command indicative of an increase of said uplink transmit power was received and a sum of increases of said uplink transmit power indicated by said at least one first uplink control command is larger than an uplink transmit power increase sum threshold.

Either of said predetermined first number of subsequent first uplink control commands and said predetermined second number of first uplink control commands may be pre-configured, may be derived e.g. by the terminal e.g. based on a history (e.g. history values), or may correspond to downloaded predetermined values (downloaded by e.g. the terminal vendor and/or chipset maker), where the downloaded predetermined values may be based on laboratory tests and/or simulations.

Said predetermined period of time may be pre-configured, may be derived e.g. by the terminal e.g. based on a history (e.g. history values), or may correspond to downloaded predetermined values (downloaded by e.g. the terminal vendor and/or chipset maker), where the downloaded predetermined values may be based on laboratory tests and/or simulations.

According to still further example embodiments, said first uplink control command is a timing advance command, and said first uplink control parameter is an uplink transmission timing.

According to a variation of the procedure shown in FIG. 3, exemplary additional operations are given, which are inherently independent from each other as such. According to such variation, an exemplary method according to example embodiments may comprise an operation of exiting, if said first uplink control command is indicative of an increment of said uplink transmission timing with respect to the current uplink transmission timing, said radio resource management measurements relaxation mode.

According to still further example embodiments, said radio resource management measurements relaxation mode is exited if a cumulative value of said uplink transmission timing calculated based on a previous cumulative value of said uplink transmission timing and said increment of said uplink transmission timing is larger than said previous cumulative value of said uplink transmission timing.

According to still further example embodiments, said radio resource management measurements relaxation mode is exited, if said increment of said uplink transmission timing indicated by said first uplink control command is larger than an uplink transmission timing increment threshold.

According to a variation of the procedure shown in FIG. 3, exemplary additional operations are given, which are inherently independent from each other as such. According to such variation, an exemplary method according to example embodiments may comprise an operation of exiting said radio resource management measurements relaxation mode, if a predetermined first number of subsequent first uplink control commands indicative of an increment of said uplink transmission timing were received, and/or if at least two first uplink control commands indicative of an increment of said uplink transmission timing were received and a sum of increments of said uplink transmission timing indicated by said at least two first uplink control commands is larger than an uplink transmission timing increment sum threshold.

According to a variation of the procedure shown in FIG. 3, exemplary additional operations are given, which are inherently independent from each other as such. According to such variation, an exemplary method according to example embodiments may comprise an operation of receiving a second uplink control command indicative of a second uplink control parameter related to said radio connection of said terminal.

Here, said deciding (S32) on exiting said radio resource management measurements relaxation mode is based on said first uplink control parameter and said second uplink control parameter.

According to still further example embodiments, said first uplink control parameter is an uplink transmit power.

According to still further example embodiments, said first uplink control command is a transmission power command.

According to still further example embodiments, said second uplink control parameter is an uplink transmission timing.

According to still further example embodiments, said first uplink control command is a timing advance command.

According to a variation of the procedure shown in FIG. 3, exemplary additional operations are given, which are inherently independent from each other as such. According to such variation, an exemplary method according to example embodiments may comprise an operation of estimating a distance between said terminal and a counterpart of said radio connection.

Here, said deciding (S32) on exiting said radio resource management measurements relaxation mode is based on said first uplink control parameter, if said distance is smaller than a decision distance threshold, and said deciding on exiting said radio resource management measurements relaxation mode is based on said second uplink control parameter, if said distance is equal to or larger than said decision distance threshold.

According to still further example embodiments, said radio resource management measurements relaxation mode has been configured by a network management entity managing said radio connection of said terminal.

According to still further example embodiments, said exiting said radio resource management measurements relaxation mode includes at least one of increasing a periodicity of measurements in relation to a serving cell serving said terminal, starting measurements in relation to said serving cell serving said terminal, and starting measurements in relation to said neighbor cells.

The example embodiments outlined above uses a concept including a radio resource management measurements relaxation mode having a reduced intensity of radio resource management measurements.

A radio resource management measurements relaxation mode having a reduced intensity of radio resource management measurements means that a measurements activity regarding e.g. the serving cell (i.e. periodicity, number) is reduced, i.e., relaxed, compared to a normal state of radio resource management measurements, as described above.

Accordingly, entering the radio resource management measurements relaxation mode having a reduced intensity of radio resource management measurements means that from then on the radio resource management measurements with respect to a specific target (e.g. serving cell) in that the periodicity or number of measurements or a level of degree of such measurements with respect to the specific target are decreased. According to some example embodiments, the radio resource management measurements relaxation mode having a reduced intensity of radio resource management measurements with respect to a specific target (e.g. serving cell) means that no radio resource management measurements with respect to the specific target are effected.

On the other hand, exiting the radio resource management measurements relaxation mode having a reduced intensity of radio resource management measurements means that a normal (i.e. non-reduced/non-relaxed) state of radio resource management measurements (as to e.g. periodicity, number, etc.) with respect to the specific target (e.g. serving cell) is (re-)established.

Exemplary embodiments outlined above are depicted below in more detail.

As mentioned above, the concept of example embodiments is aimed at UEs (as an example of terminals) in RRC_CONNECTED state, where traffic is ongoing.

As mentioned above, as a first alternative, the UE exits the relaxed measurement state as function of the uplink transmit power.

The UE uplink power changes primarily when the propagation path distance changes.

The relationship between distance and power is modelled in various propagation path loss models. The simplest is the free-space propagation model which assumes line of sight (LOS), no reflections, and isotropic antennas.

The model is described using the following formula.

$$PL[dB] = 20\log_{10}\left(\frac{4\pi d}{\lambda}\right),$$

where $d$ is the distance and $\lambda$ is the wavelength

The model is an exponential function of the distance between the transmit and receive antennas (e.g. UE and NB) and roughly means that the received power drops by 6 dB every time the distance doubles. Given the relationship between transmit and receive antenna distance, according to example embodiments, the relaxed measurement state is exited when the UE uplink transmit power exceeds a threshold.

Figure 8:
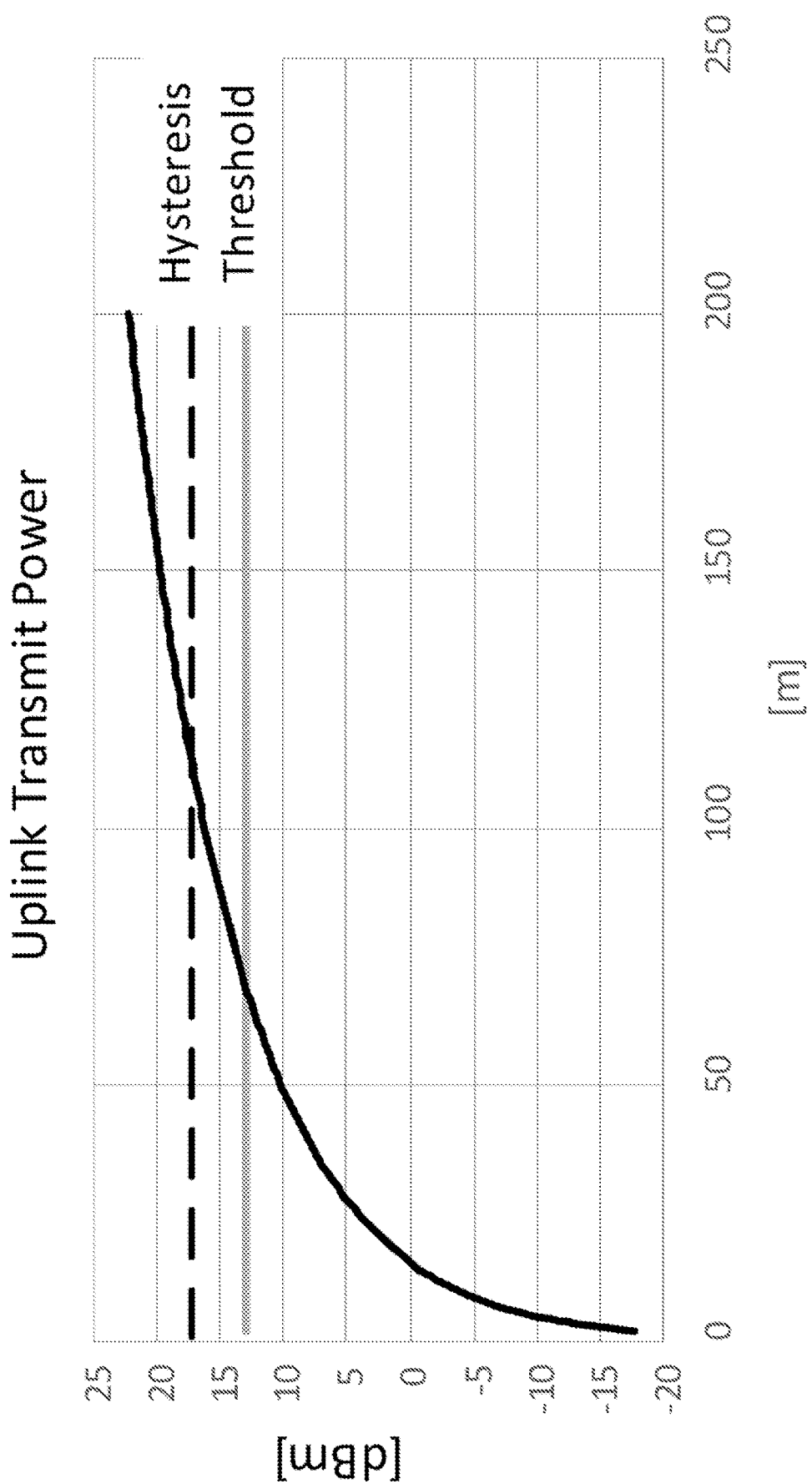
FIG. 8 is a schematic diagram illustrating a relationship between a distance to a cell and an uplink power.

FIG. 8 is a schematic diagram illustrating a relationship between a distance to a cell and an uplink transmit power and in particular shows an uplink power threshold.

In FIG. 8, an exemplary threshold of 13 dBm is assumed.

According to example embodiments, it is preferable that such threshold is optimized based on simulations and/or laboratory experiments and/or drive tests in different environments.

According to example embodiments related to option 1 of the first alternative, the condition for exiting the relaxed measurement state is expressed as follows:

$$UE_{ul_{pow}}(t-1)+TPC(t)-\text{Hysteresis} > \text{Threshold}_{power}$$

Figure 9:
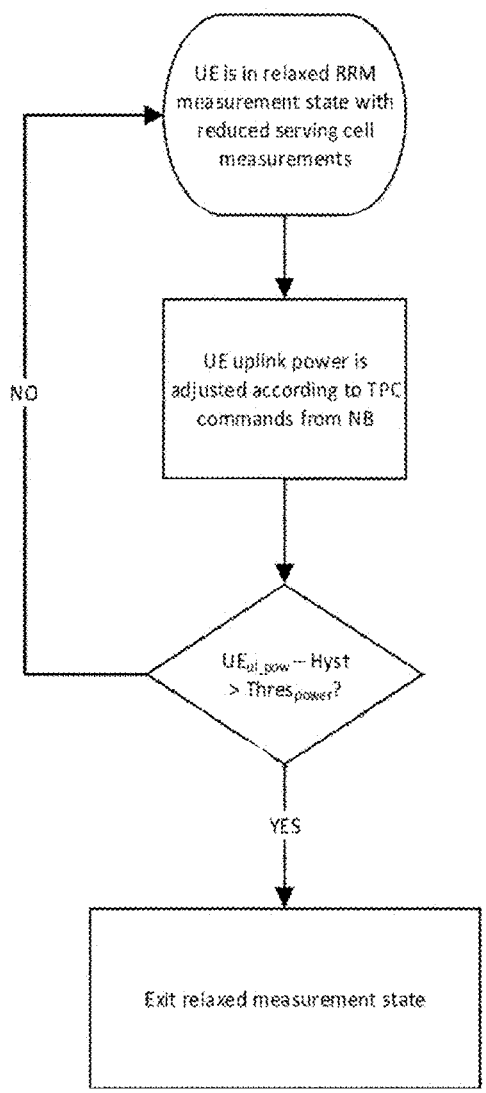
FIG. 9 is a schematic diagram of a procedure according to example embodiments.

FIG. 9 is a schematic diagram of a procedure according to example embodiments and in particular shows a decision flow for the uplink (UL) transmit power as the exit criterion.

While option 1 is the preferred implementation of the first alternative, as mentioned above, according to example embodiments, other uplink transmit power related criteria can be utilized instead (e.g. exceedance of the relative variation of the uplink transmit power in time of a certain threshold (option 2), receipt of a number N1 of subsequent TPC commands indicating to increase the transmit power (option 2.a), receipt of a number N2 of TPC commands indicating to increase the transmit power within a time window W (option 2.b), receipt of one or more TPC commands indicating to increase the transmit power, where the total power increase in dB is above a threshold T2 (option 2.c), and any combination of these criteria (option 2.d)).

Furthermore, as a second alternative, the UE exits the relaxed measurement state as function of the uplink transmission timing.

The UE uplink timing changes when the propagation path distance changes. The uplink timing adjustments done via timing advance commands are related to length of the signal path from transmitter to receiver.

The relationship to the length of the signal path is expressed using the following formula.

$$d = \frac{c \cdot N_{TA}}{2},$$

where
 d is the distance,
 c the speed of light and
 $N_{TA}$ is the accumulated timing advance. See below equation.

When the distance between the transmitter and the receiver increases, the UE uplink timing decreases, i.e. the UE will have to transmit earlier in time for the signal to reach the gNB receiver at the expected time.

The TA command provides discrete adjustments with a given time resolution that depends on the sub-carrier spacing.

The timing adjustment $N_{TA\_new}$ is computed based on the following formula.

$$N_{TA_{new}} = N_{TA_{old}} + \frac{(T_A - 31) \cdot 16 \cdot 64}{2^\mu},$$

where $T_A$ is the step size as provided by the network [0.63] and $\mu$ is the SCS index For SCS 120 kHz, this results in a minimum step size (resolution) of approximately 65 ns, see the table above illustrating the accuracy of the TA steps for each Sub-Carrier Spacing (SCS) index.

Figure 10:
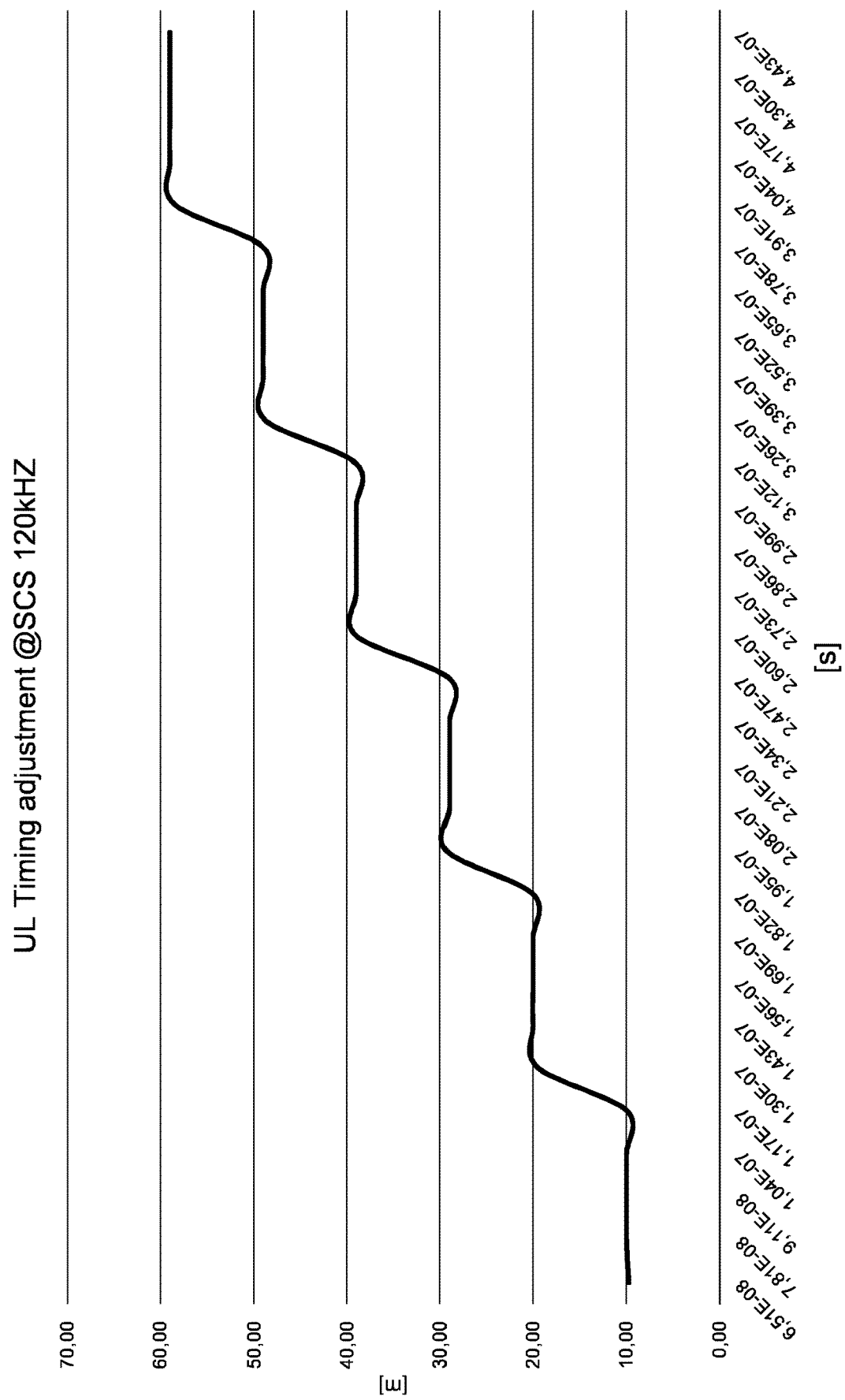
FIG. 10 is a schematic diagram illustrating a relationship between a distance to a cell and an uplink timing adjustment.

Approximately 65 ns equals a one-way distance of about 10 m, as is derivable from FIG. 10 illustrating a relationship between a distance to a cell and an uplink timing adjustment and in particular showing UL timing adjustments with 120 kHz sub-carrier spacing.

According to example embodiments, the UE leaves the relaxed measurement state when the UL timing decreases.

A condition for exiting the relaxed measurement state according to example embodiments is expressed as:

$$N_{TA\_new} > N_{TA\_old}$$

Figure 11:
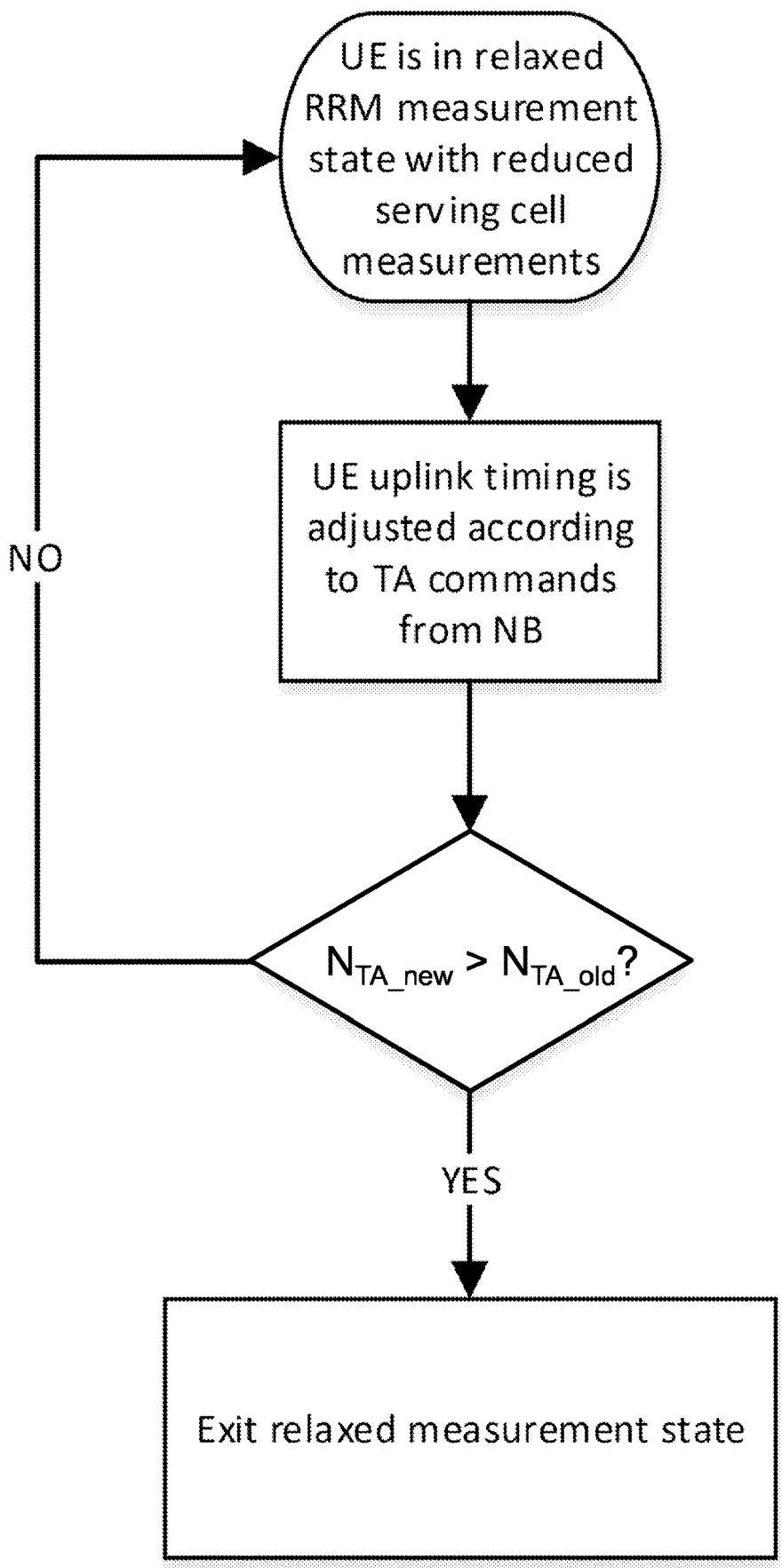
FIG. 11 is a schematic diagram of a procedure according to example embodiments.

FIG. 11 is a schematic diagram of a procedure according to example embodiments and in particular shows a decision flow for UL timing changes as the exit criterion.

Furthermore, as a third alternative, the UE exits the relaxed measurement state as function of both the transmit power and time alignment.

The accuracy of the TA and TPC steps in terms of distance is an important aspect to consider, since this affects the robustness of the implementation.

The TA steps has a linear relationship to the distance as described in relation to the second alternative. Hence, the TA step accuracy, in term of distance, is the same regardless of distance between UE transmitter and gNB receiver. On the contrary, the TPC steps have an exponential relationship to the distance as described in relation to the first alternative. This means that the accuracy of the UL power steps, in terms of distance, decreases when the distance between transmitter and receiver increases.

This means that the UL power is a better measure when the UE is closer to the gNB while TA is a better measure than UL power when the UE is further away.

There will be a crossing point for each SCS where timing becomes a better measure than power.

According to example embodiments, this crossing point is used as a threshold to switch from UL power to UL timing as input to the exit decision.

Therefore, according to example embodiments, either UL transmit power or UL timing is used depending on the estimated distance between the UE and gNB.

Figure 12:
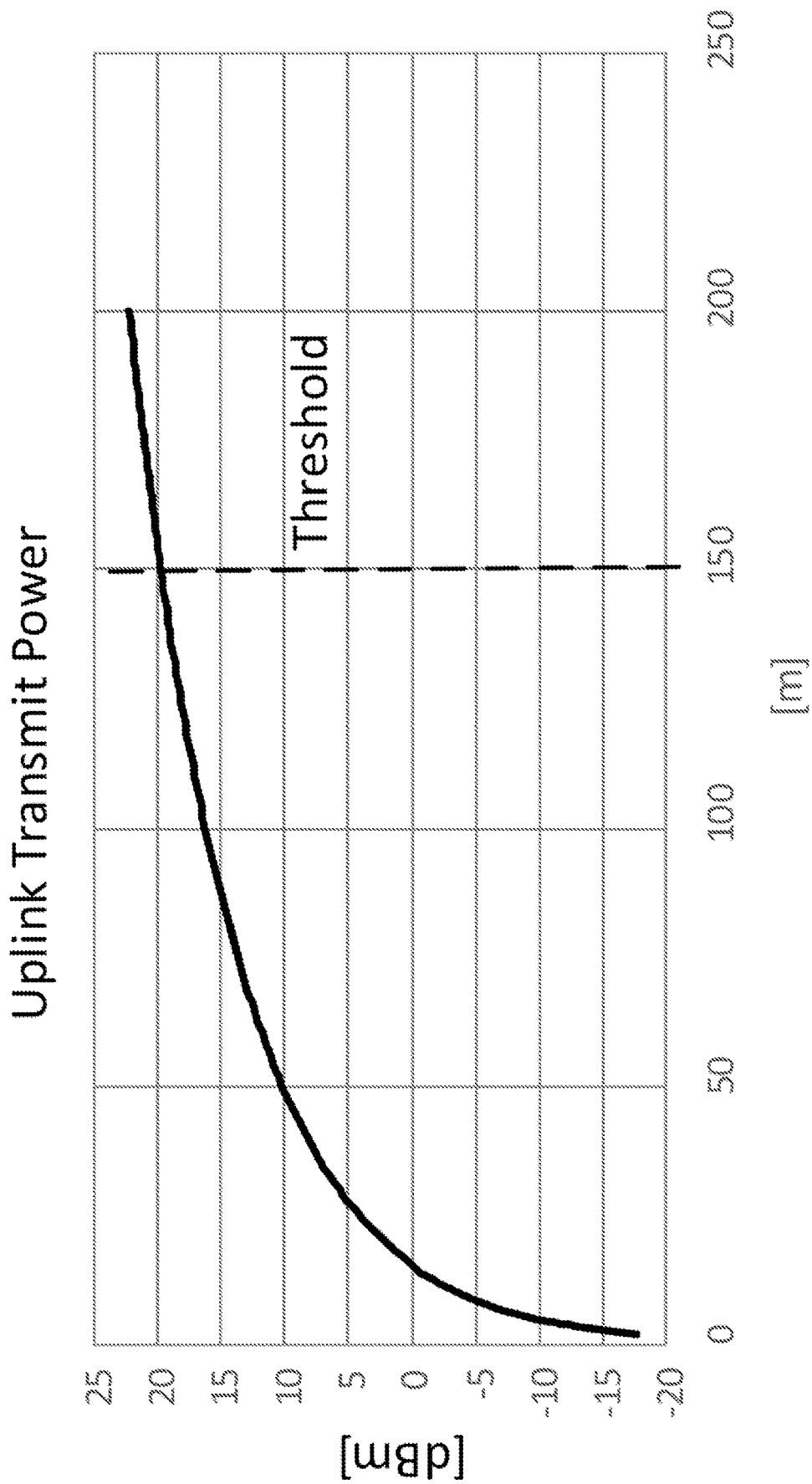
FIG. 12 is a schematic diagram illustrating a relationship between a distance to a cell and an uplink power.

FIG. 12 is a schematic diagram illustrating a relationship between a distance to a cell and an uplink power and in particular shows a threshold defined to switch from the UL transmit power to the UL timing measure as the criterion.

FIG. 12 shows an example where the threshold is set to 150 m.

Preferably, according to example embodiments, the threshold is calculated statically for each SCS.

The application of the two criteria dependent on the distance in relation to the threshold Threshold$_{power}$ is expressed as follows:

$$UE_{ul_{pow}}(t-1)+TPC(t)-Hysteresis>Threshold_{power}, \text{ if } Distance<Threshold_{distance}$$

and $$N_{TA_{new}}>N_{TA_{old}}, \text{if } Distance \geq Threshold_{distance}$$

Figure 13:
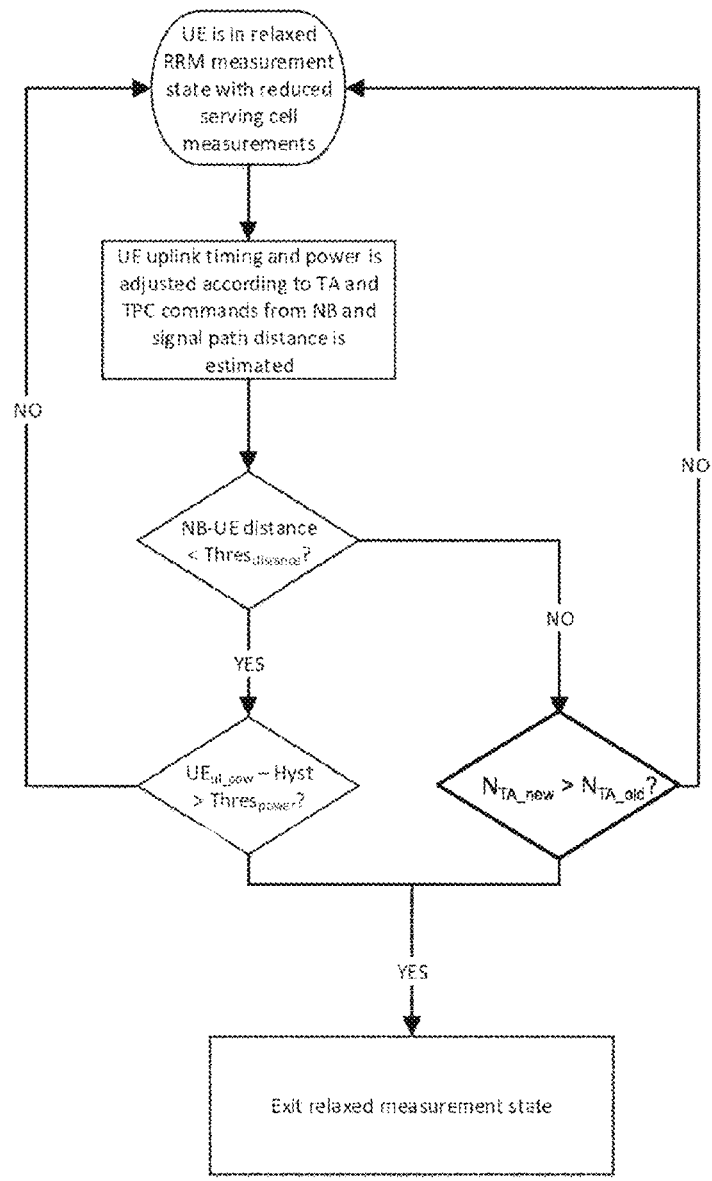
FIG. 13 is a schematic diagram of a procedure according to example embodiments.

FIG. 13 is a schematic diagram of a procedure according to example embodiments and in particular illustrates the decision flow for UL power and timing combined as exit criteria.

According to the concept of example embodiments, RLF is prevented in case the serving cell measurements are relaxed as part of a UE power save scheme. All implementations of the concept of example embodiments are UE implementation specific and do not require any changes on network/gNB side or in standard specifications. Instead, the legacy measures of TPC and TA are used as part of example embodiments.

The above-described procedures and functions may be implemented by respective functional elements, processors, or the like, as described below.

In the foregoing exemplary description of the network entity, only the units that are relevant for understanding the principles of example embodiments have been described using functional blocks. The network entity may comprise further units that are necessary for its respective operation. However, a description of these units is omitted in this specification. The arrangement of the functional blocks of the devices is not construed to limit example embodiments, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

In FIG. 14, an alternative illustration of apparatuses according to example embodiments is depicted. As indicated in FIG. 14, according to example embodiments, the apparatus (terminal) 10' (corresponding to the terminal 10) comprises a processor 141, a memory 142 and an interface 143, which are connected by a bus 144 or the like, and the apparatus may be connected to e.g. other apparatuses via link 149.

The processor 141 and/or the interface 143 may also include a modem or the like to facilitate communication over a (hardwire or wireless) link, respectively. The interface 143 may include a suitable transceiver coupled to one or more antennas or communication means for (hardwire or wireless) communications with the linked or connected device(s), respectively. The interface 143 is generally configured to communicate with at least one other apparatus, i.e. the interface thereof.

The memory 142 may store respective programs assumed to include program instructions or computer program code that, when executed by the respective processor, enables the respective electronic device or apparatus to operate in accordance with the example embodiments.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to example embodiments, an apparatus representing the terminal 10 (in a radio resource management measurements relaxation mode having a reduced intensity of radio resource management measurements) comprises at least one processor 141, at least one memory 142 including computer program code, and at least one interface 143 configured for communication with at least another apparatus. The processor (i.e. the at least one processor 141, with the at least one memory 142 and the computer program code) is configured to perform receiving a first uplink control command indicative of a first uplink control parameter related to a radio connection of said terminal (thus the apparatus comprising corresponding means for receiving), and to perform deciding on exiting said radio resource management measurements relaxation mode based on said first uplink control parameter (thus the apparatus comprising corresponding means for deciding).

For further details regarding the operability/functionality of the individual apparatuses, reference is made to the above description in connection with any one of FIGS. 1 to 13, respectively.

For the purpose of example embodiments as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of example embodiments. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

Example embodiments also cover any conceivable combination of method steps and operations described above, and any conceivable combination of nodes, apparatuses, modules or elements described above, as long as the above-described concepts of methodology and structural arrangement are applicable.

In view of the above, there are provided measures for terminal uplink parameter based measurement relaxation change. Such measures exemplarily comprise, at a terminal in a radio resource management measurements relaxation mode having a reduced intensity of radio resource management measurements, receiving a first uplink control command indicative of a first uplink control parameter related to a radio connection of said terminal, and deciding on exiting said radio resource management measurements relaxation mode based on said first uplink control parameter.

Even though example embodiments are described above with reference to the examples according to the accompanying drawings, it is to be understood that example embodiments are not restricted thereto. Rather, it is apparent to those skilled in the art that example embodiments can be modified in many ways without departing from the scope of the inventive idea as disclosed herein.

EXAMPLES

Example 1. A method of a terminal in a radio resource management measurements relaxation mode having a reduced intensity of radio resource management measurements, the method comprising receiving a first uplink control command indicative of a first uplink control parameter related to a radio connection of said terminal, and deciding on exiting said radio resource management measurements relaxation mode based on said first uplink control parameter.

Example 2. The method according to Example 1, wherein in relation to said deciding, the method further comprises evaluating whether said first uplink control parameter is indicative of exceeding a predetermined radio condition deterioration, and determining, if said first uplink control parameter is indicative of exceeding said predetermined radio condition deterioration, to exit said radio resource management measurements relaxation mode.

Example 3. The method according to Example 1 or 2, wherein said terminal is in a radio resource control connected state, and/or said first uplink control parameter is indicative of exceeding said predetermined radio condition deterioration related to a distance between said terminal and a counterpart of said radio connection.

Example 4. The method according to any of Examples 1 to 3, wherein
in relation to said receiving said first uplink control command, the method further comprises
receiving a plurality of first uplink control commands including said first uplink control command and being indicative of said first uplink control parameter related to said radio connection of said terminal.

Example 5. The method according to any of Examples 1 to 4, wherein
said first uplink control command is a transmission power command, and
said first uplink control parameter is an uplink transmit power.

Example 6. The method according to Example 5, further comprising
exiting, if said first uplink control command is indicative of an increment of said uplink transmit power and an absolute value of said uplink transmit power ascertained based on said increment of said uplink transmit power is larger than an uplink transmit power threshold, said radio resource management measurements relaxation mode.

Example 7. The method according to Example 6, wherein
said radio resource management measurements relaxation mode is exited if said absolute value of said uplink transmit power is larger than said uplink transmit power threshold by at least a predetermined hysteresis.

Example 8. The method according to Example 5, further comprising
exiting, if said first uplink control command is indicative of an increment of said uplink transmit power and a change of said uplink transmit power in time ascertained based on said increment of said uplink transmit power is larger than an uplink transmit power change threshold, said radio resource management measurements relaxation mode.

Example 9. The method according to Example 8, wherein
said radio resource management measurements relaxation mode is exited, if
a predetermined first number of subsequent first uplink control commands indicative of an increase of said uplink transmit power were received, and/or if
a predetermined second number of first uplink control commands indicative of an increase of said uplink transmit power were received within a predetermined period of time, and/or if
at least one first uplink control command indicative of an increase of said uplink transmit power was received and a sum of increases of said uplink transmit power indicated by said at least one first uplink control command is larger than an uplink transmit power increase sum threshold.

Example 10. The method according to any of Examples 1 to 4, wherein
said first uplink control command is a timing advance command, and
said first uplink control parameter is an uplink transmission timing.

Example 11. The method according to Example 10, further comprising
exiting, if said first uplink control command is indicative of an increment of said uplink transmission timing with respect to the current uplink transmission timing, said radio resource management measurements relaxation mode.

Example 12. The method according to Example 11, wherein
said radio resource management measurements relaxation mode is exited if a cumulative value of said uplink transmission timing calculated based on a previous cumulative value of said uplink transmission timing and said increment of said uplink transmission timing is larger than said previous cumulative value of said uplink transmission timing.

Example 13. The method according to Example 11 or 12, wherein
said radio resource management measurements relaxation mode is exited, if
said increment of said uplink transmission timing indicated by said first uplink control command is larger than an uplink transmission timing increment threshold.

Example 14. The method according to Example 10, further comprising
exiting said radio resource management measurements relaxation mode, if
a predetermined first number of subsequent first uplink control commands indicative of an increment of said uplink transmission timing were received, and/or if
at least two first uplink control commands indicative of an increment of said uplink transmission timing were received and a sum of increments of said uplink transmission timing indicated by said at least two first uplink control commands is larger than an uplink transmission timing increment sum threshold.

Example 15. The method according to any of Examples 1 to 4, further comprising
receiving a second uplink control command indicative of a second uplink control parameter related to said radio connection of said terminal, wherein
said deciding on exiting said radio resource management measurements relaxation mode is based on said first uplink control parameter and said second uplink control parameter.

Example 16. The method according to Example 15, wherein
said first uplink control parameter is an uplink transmit power,
said first uplink control command is a transmission power command,
said second uplink control parameter is an uplink transmission timing, and
said first uplink control command is a timing advance command.

Example 17. The method according to Example 16, further comprising
estimating a distance between said terminal and a counterpart of said radio connection, wherein
said deciding on exiting said radio resource management measurements relaxation mode is based on said first uplink control parameter, if said distance is smaller than a decision distance threshold, and said deciding on exiting said radio resource management measurements relaxation mode is based on said second uplink control parameter, if said distance is equal to or larger than said decision distance threshold.

Example 18. The method according to any of Examples 1 to 17, wherein said radio resource management measurements relaxation mode has been configured by a network management entity managing said radio connection of said terminal.

Example 19. The method according to any of Examples 1 to 18, wherein
said exiting said radio resource management measurements relaxation mode includes at least one of
increasing a periodicity of measurements in relation to a serving cell serving said terminal,
starting measurements in relation to said serving cell serving said terminal, and
starting measurements in relation to said neighbor cells.

Example 20. An apparatus of a terminal in a radio resource management measurements relaxation mode having a reduced intensity of radio resource management measurements, the apparatus comprising
receiving circuitry configured to receive a first uplink control command indicative of a first uplink control parameter related to a radio connection of said terminal, and
deciding circuitry configured to decide on exiting said radio resource management measurements relaxation mode based on said first uplink control parameter.

Example 21. The apparatus according to Example 20, further comprising
evaluating circuitry configured to evaluate whether said first uplink control parameter is indicative of exceeding a predetermined radio condition deterioration, and
determining circuitry configured to determine, if said first uplink control parameter is indicative of exceeding said predetermined radio condition deterioration, to exit said radio resource management measurements relaxation mode.

Example 22. The apparatus according to Example 20 or 21, wherein
said terminal is in a radio resource control connected state, and/or
said first uplink control parameter is indicative of exceeding said predetermined radio condition deterioration related to a distance between said terminal and a counterpart of said radio connection.

Example 23. The apparatus according to any of Examples 20 to 22, wherein
said receiving circuitry is configured to receive a plurality of first uplink control commands including said first uplink control command and being indicative of said first uplink control parameter related to said radio connection of said terminal.

Example 24. The apparatus according to any of Examples 20 to 23, wherein
said first uplink control command is a transmission power command, and
said first uplink control parameter is an uplink transmit power.

Example 25. The apparatus according to Example 24, further comprising
exiting circuitry configured to exit, if said first uplink control command is indicative of an increment of said uplink transmit power and an absolute value of said uplink transmit power ascertained based on said increment of said uplink transmit power is larger than an uplink transmit power threshold, said radio resource management measurements relaxation mode.

Example 26. The apparatus according to Example 25, wherein
said radio resource management measurements relaxation mode is exited if said absolute value of said uplink transmit power is larger than said uplink transmit power threshold by at least a predetermined hysteresis.

Example 27. The apparatus according to Example 24, further comprising
exiting circuitry configured to exit, if said first uplink control command is indicative of an increment of said uplink transmit power and a change of said uplink transmit power in time ascertained based on said increment of said uplink transmit power is larger than an uplink transmit power change threshold, said radio resource management measurements relaxation mode.

Example 28. The apparatus according to Example 27, wherein
said exiting circuitry is configured to exit said radio resource management measurements relaxation mode, if
a predetermined first number of subsequent first uplink control commands indicative of an increase of said uplink transmit power were received, and/or if
a predetermined second number of first uplink control commands indicative of an increase of said uplink transmit power were received within a predetermined period of time, and/or if
at least one first uplink control command indicative of an increase of said uplink transmit power was received and a sum of increases of said uplink transmit power indicated by said at least one first uplink control command is larger than an uplink transmit power increase sum threshold.

Example 29. The apparatus according to any of Examples 20 to 23, wherein
said first uplink control command is a timing advance command, and
said first uplink control parameter is an uplink transmission timing.

Example 30. The apparatus according to Example 29, further comprising
exiting circuitry configured to exit, if said first uplink control command is indicative of an increment of said uplink transmission timing with respect to the current uplink transmission timing, said radio resource management measurements relaxation mode.

Example 31. The apparatus according to Example 30, wherein
said exiting circuitry is configured to exit said radio resource management measurements relaxation mode if a cumulative value of said uplink transmission timing calculated based on a previous cumulative value of said uplink transmission timing and said increment of said uplink transmission timing is larger than said previous cumulative value of said uplink transmission timing.

Example 32. The apparatus according to Example 30 or 31, wherein
said exiting circuitry is configured to exit said radio resource management measurements relaxation mode, if
said increment of said uplink transmission timing indicated by said first uplink control command is larger than an uplink transmission timing increment threshold.

Example 33. The apparatus according to Example 29, further comprising
exiting circuitry configured to exit said radio resource management measurements relaxation mode, if
a predetermined first number of subsequent first uplink control commands indicative of an increment of said uplink transmission timing were received, and/or if at least two first uplink control commands indicative of an increment of said uplink transmission timing were received and a sum of increments of said uplink transmission timing indicated by said at least two first uplink control commands is larger than an uplink transmission timing increment sum threshold.

Example 34. The apparatus according to any of Examples 20 to 23, wherein said receiving circuitry is further configured to receive a second uplink control command indicative of a second uplink control parameter related to said radio connection of said terminal, and said deciding circuitry is further configured to decide on exiting said radio resource management measurements relaxation mode is based on said first uplink control parameter and said second uplink control parameter.

Example 35. The apparatus according to Example 34, wherein said first uplink control parameter is an uplink transmit power, said first uplink control command is a transmission power command, said second uplink control parameter is an uplink transmission timing, and said first uplink control command is a timing advance command.

Example 36. The apparatus according to Example 35, further comprising estimating circuitry configured to estimate a distance between said terminal and a counterpart of said radio connection, wherein said deciding circuitry is configured to decide on exiting said radio resource management measurements relaxation mode based on said first uplink control parameter, if said distance is smaller than a decision distance threshold, and to decide on exiting said radio resource management measurements relaxation mode based on said second uplink control parameter, if said distance is equal to or larger than said decision distance threshold.

Example 37. The apparatus according to any of Examples 20 to 36, wherein said radio resource management measurements relaxation mode has been configured by a network management entity managing said radio connection of said terminal.

Example 38. The apparatus according to any of Examples 20 to 37, wherein said exiting said radio resource management measurements relaxation mode includes at least one of increasing a periodicity of measurements in relation to a serving cell serving said terminal, starting measurements in relation to said serving cell serving said terminal, and starting measurements in relation to said neighbor cells.

Example 39. An apparatus of a terminal in a radio resource management measurements relaxation mode having a reduced intensity of radio resource management measurements, the apparatus comprising at least one processor, at least one memory including computer program code, and at least one interface configured for communication with at least another apparatus, the at least one processor, with the at least one memory and the computer program code, being configured to cause the apparatus to perform:

receiving a first uplink control command indicative of a first uplink control parameter related to a radio connection of said terminal, and deciding on exiting said radio resource management measurements relaxation mode based on said first uplink control parameter.

Example 40. A computer program product comprising computer-executable computer program code which, when the program is run on a computer, is configured to cause the computer to carry out the method according to any one of Examples 1 to 19.

Example 41. The computer program product according to Example 40, wherein the computer program product comprises a computer-readable medium on which the computer-executable computer program code is stored, and/or wherein the program is directly loadable into an internal memory of the computer or a processor thereof.

List of Acronyms and Abbreviations
3GPP 3rd Generation Partnership Project
cDRX connected mode discontinuous reception
CE control element
DCI downlink control information
DRX discontinuous reception
gNB next generation NB
LOS line of sight
MAC medium access control
NB NodeB
NW network
OFDM orthogonal frequency division multiplex[ing]
PDCCH Physical Downlink Control Channel
PDSCH Physical Downlink Shared Channel
PUCCH Physical Uplink Control Channel
PUSCH Physical Uplink Shared Channel
RAT radio access technology
RLF radio link failure
RRC radio resource control
RRM radio resource management
RSRP reference signal received power
RSRQ reference signal received quality
SCS Sub-Carrier Spacing
SMTC SS/PBCH block measurement time configuration
SS/PBCH synchronization signal/physical broadcast channel
TA timing advance
TPC transmit power control
UE user equipment
UL uplink

The invention claimed is:

1. A method, comprising:

performing by a terminal in a radio resource management measurements relaxation mode having a reduced intensity of radio resource management measurements, comprising:

receiving a first uplink control command indicative of a first uplink control parameter related to a radio connection of said terminal instructing the terminal to perform an uplink timing adjustment; and based at least in part on the first uplink control parameter indicating that a predetermined radio condition deterioration is being exceeded, exit said radio resource management measurements relaxation mode, wherein the exiting is performed when the uplink timing adjustment decreases by a certain threshold or when a decrease over a certain threshold of the uplink timing adjustment is indicated by subsequent uplink timing adjustments.

2. The method according to claim 1, wherein in relation to said deciding, the method further comprises:
evaluating whether said first uplink control parameter is indicative of exceeding the predetermined radio condition deterioration, and
determining, when said first uplink control parameter is indicative of exceeding said predetermined radio condition deterioration, to exit said radio resource management measurements relaxation mode.

3. The method according to claim 1, wherein:
at least one of said terminal is in a radio resource control connected state, or
said first uplink control parameter is indicative of exceeding said predetermined radio condition deterioration related to a distance between said terminal and a counterpart of said radio connection.

4. The method according to claim 1, wherein in relation to said receiving said first uplink control command, the method further comprises:
receiving a plurality of first uplink control commands including said first uplink control command and being indicative of said first uplink control parameter related to said radio connection of said terminal.

5. The method according to claim 1, wherein:
said first uplink control command is a transmission power command, and
said first uplink control parameter is an uplink transmit power.

6. The method according to claim 1, wherein:
said first uplink control command is a timing advance command, and
said first uplink control parameter is an uplink transmission timing.

7. The method according to claim 1, wherein said exiting said radio resource management measurements relaxation mode includes at least one of:
increasing a periodicity of measurements in relation to a serving cell serving said terminal,
starting measurements in relation to said serving cell serving said terminal, or
starting measurements in relation to said neighbor cells.

8. An apparatus, comprising:
at least one processor; and
at least one memory storing instructions, that when executed by the at least one processor, cause the apparatus at least to:
perform with a terminal in a radio resource management measurements relaxation mode having a reduced intensity of radio resource management measurements, operations comprising:
receiving first uplink control command indicative of a first uplink control parameter related to a radio connection of said terminal instructing the terminal to perform an uplink timing adjustment, and
based at least in part on the first uplink control parameter indicating that a predetermined radio condition deterioration is being exceeded, exiting said radio resource management measurements relaxation mode,
wherein the exiting is performed when the uplink timing adjustment decreases by a certain threshold or when a decrease over a certain threshold of the uplink timing adjustment is indicated by subsequent uplink timing adjustments.

9. The apparatus according to claim 8, wherein the at least one memory storing instructions are executed by the at least one processor to cause the apparatus at least to:
determine, when said first uplink control parameter is indicative of exceeding said predetermined radio condition deterioration, to exit said radio resource management measurements relaxation mode.

10. The apparatus according to claim 8, wherein:
at least one of said terminal is in a radio resource control connected state, or
said first uplink control parameter is indicative of exceeding said predetermined radio condition deterioration related to a distance between said terminal and a counterpart of said radio connection.

11. The apparatus according to claim 8, wherein the instructions are executed by the at least one processor to cause the apparatus at least to:
receive a plurality of first uplink control commands including said first uplink control command and being indicative of said first uplink control parameter related to said radio connection of said terminal.

12. The apparatus according to claim 8, wherein said first uplink control command is a transmission power command and said first uplink control parameter is an uplink transmit power.

13. The apparatus according to claim 8, wherein said first uplink control command is a timing advance command and said first uplink control parameter is an uplink transmission timing.

14. The apparatus according to claim 8, wherein said exiting said radio resource management measurements relaxation mode includes at least one of:
increasing a periodicity of measurements in relation to a serving cell serving said terminal,
starting measurements in relation to said serving cell serving said terminal, or
starting measurements in relation to said neighbor cells.

15. An apparatus, comprising:
at least one processor,
and at least one memory storing instructions, wherein the instructions when executed by the at least one processor cause the apparatus to:
with a terminal in a radio resource management measurements relaxation mode having a reduced intensity of radio resource management measurements,
receive a first uplink control command indicative of a first uplink control parameter related to a radio connection of said terminal instructing the terminal to perform an uplink timing adjustment, and
based at least in part on the first uplink control parameter indicating that a predetermined radio condition deterioration is being exceeded, exiting said radio resource management measurements relaxation mode,
wherein the exiting is performed when the uplink timing adjustment decreases by a certain threshold or when a decrease over a certain threshold of the uplink timing adjustment is indicated by subsequent uplink timing adjustments.

16. A non-transitory program storage device readable by a machine, tangibly embodying a program of instructions executable by the machine for performing operations, the operations comprising the method as claimed in claim 1.

17. The non-transitory program storage device as claimed in claim 16 where the operations further comprise receiving a plurality of first uplink control commands including said first uplink control command and being indicative of said first uplink control parameter related to said radio connection of said terminal.

* * * * *